United States Patent
Wang et al.

(10) Patent No.: US 11,640,642 B2
(45) Date of Patent: May 2, 2023

(54) METHOD AND SYSTEM FOR DYNAMICALLY PREDICTING DEOXYNIVALENOL CONTENT OF WHEAT AT HARVEST

(71) Applicant: ACADEMY OF NATIONAL FOOD AND STRATEGIC RESERVES ADMINISTRATION, Beijing (CN)

(72) Inventors: Songxue Wang, Beijing (CN); Jin Ye, Beijing (CN); Sen Li, Beijing (CN); Di Cai, Beijing (CN); Bingjie Li, Beijing (CN)

(73) Assignee: ACADEMY OF NATIONAL FOOD AND STRATEGIC RESERVES ADMINISTRATION, Beijing (CN)

( * ) Notice: Subject to any disclaimer, the term of this patent is extended or adjusted under 35 U.S.C. 154(b) by 0 days.

(21) Appl. No.: 17/846,318

(22) Filed: Jun. 22, 2022

(65) Prior Publication Data
US 2023/0005084 A1    Jan. 5, 2023

(30) Foreign Application Priority Data
Jun. 25, 2021   (CN) .......................... 202110714113.8

(51) Int. Cl.
*G06F 11/30* (2006.01)
*G06Q 50/02* (2012.01)
(Continued)

(52) U.S. Cl.
CPC .............. *G06Q 50/02* (2013.01); *G01W 1/00* (2013.01); *G06Q 10/04* (2013.01); *G06Q 10/0635* (2013.01); *G06Q 10/0639* (2013.01)

(58) Field of Classification Search
CPC ...................................................... G06Q 50/02
See application file for complete search history.

(56) References Cited

U.S. PATENT DOCUMENTS

| 2002/0088022 A1* | 7/2002 | Harris | ..................... C12N 15/65 800/279 |
| 2019/0156437 A1* | 5/2019 | Dail | ..................... A01M 7/0089 |

FOREIGN PATENT DOCUMENTS

CN         110596280 A  * 12/2019 ............. G01N 21/25

\* cited by examiner

*Primary Examiner* — Phuong Huynh
(74) *Attorney, Agent, or Firm* — Rankin, Hill & Clark LLP

(57) ABSTRACT

The present application provides a method and system for dynamically predicting a deoxynivalenol content of wheat at harvest, including: on the basis of historical data, screening out by particle swarm optimization algorithm combined factors suitable for establishing a prediction model, and establishing the prediction model by using the combined factors; on the basis of data of a current year, predicting a second flowering date and a second harvest date of wheat in the current year by an agricultural model; then obtaining a weather forecast on the basis of the second flowering date and the second harvest date, and combining the weather forecast and geographic data into correlated factors; and finally predicting the deoxynivalenol content of wheat at harvest by means of the prediction model and the correlated factors. Compared with the prior art, statistical items in the prediction model are more comprehensive, and growth period data of the current year can be dynamically predicted on the basis of growth period indexes model, thus continuously adjusting and establishing the prediction model. In addition, an overhead time for screening multi-dimensional large-batch data by the particle swarm optimization algorithm has more advantages, and the prediction model established by a multiple linear regression algorithm has higher precision.

9 Claims, 5 Drawing Sheets

(51) Int. Cl.
*G01W 1/00* (2006.01)
*G06Q 10/04* (2023.01)
*G06Q 10/0635* (2023.01)
*G06Q 10/0639* (2023.01)

FIG. 5

| Station Name | Province | Station Designator (number) | Latitude (LONG) | Longitude (LONG) | Station Elevation (meter) | Administrative Region Code | Year (y) | Month (m) | Day (d) | Hour (h) | Temperature /Air temperature (degress Celsius (°C)) | Relative humidity (percent age) | Precipitation in the past hour |
|---|---|---|---|---|---|---|---|---|---|---|---|---|---|
| Song Country | Henan | 57162 | 34.139 | 112.0672 | 440.7000 | 410325 | 2021 | 5 | 11 | 0 | 16.9000 | 66 | 0.0000 |
| Wuwei | Anhui | 58329 | 31.333 | 117.8667 | 9.6000 | 340225 | 2021 | 5 | 11 | 0 | 22.1000 | 93 | 0.0000 |
| Huaibin | Henan | 58205 | 32.466 | 115.4236 | 34.9000 | 411527 | 2021 | 5 | 11 | 0 | 17.4000 | 100 | 0.0000 |
| Zhaoyuan | Shandong | 54755 | 37.328 | 120.3869 | 117.8000 | 370685 | 2021 | 5 | 11 | 0 | 14.5000 | 76 | 0.0000 |
| Lu'an | Anhui | 58311 | 31.733 | 116.5 | 74.1000 | 341501 | 2021 | 5 | 11 | 0 | 19.0000 | 94 | 0.2000 |
| Wuhe | Anhui | 58129 | 33.15 | 117.8333 | 14.9000 | 340322 | 2021 | 5 | 11 | 0 | 16.2000 | 97 | 0.0000 |
| Lingbao | Henan | 57056 | 34.538 | 110.8558 | 484.5000 | 411282 | 2021 | 5 | 11 | 0 | 20.1000 | 49 | 0.0000 |
| Hefei | Anhui | 58321 | 31.956 | 117.0572 | 49.8000 | 340101 | 2021 | 5 | 11 | 0 | 18.5000 | 93 | 0.0000 |
| Tongling | Anhui | 58429 | 30.983 | 117.85 | 11.0000 | 340706 | 2021 | 5 | 11 | 0 | 22.2000 | 92 | 0.0000 |
| Qingfeng | Henan | 54902 | 35.942 | 115.1428 | 49.3000 | 410922 | 2021 | 5 | 11 | 0 | 13.7000 | 90 | 0.0000 |
| Kaifeng | Henan | 57091 | 34.802 | 114.2947 | 73.7000 | 410211 | 2021 | 5 | 11 | 0 | 16.4000 | 77 | 0.0000 |
| Anguo | Hebei | 54604 | 38.405 | 115.2919 | 31.0000 | 130683 | 2021 | 5 | 11 | 0 | 15.5000 | 76 | 0.0000 |
| Qinhuangdao | Hebei | 54449 | 39.85 | 119.5167 | 2.4000 | 130301 | 2021 | 5 | 11 | 0 | 15.7000 | 78 | 0.0000 |
| Shucheng | Anhui | 58316 | 31.467 | 116.9167 | 23.6000 | 341523 | 2021 | 5 | 11 | 0 | 21.1000 | 94 | 0.3000 |
| Xiangcheng | Henan | 57182 | 33.851 | 113.5203 | 80.4000 | 411025 | 2021 | 5 | 11 | 0 | 18.5000 | 69 | 0.0000 |
| Wuhu Country | Anhui | 58338 | 31.117 | 118.6 | 40.0000 | 340207 | 2021 | 5 | 11 | 0 | 22.1000 | 96 | 0.0000 |
| Changfeng | Anhui | 58220 | 32.423 | 117.1553 | 45.0000 | 340121 | 2021 | 5 | 11 | 0 | 16.8000 | 94 | 0.0000 |
| Fengtai | Anhui | 58212 | 32.717 | 116.7667 | 23.0000 | 340421 | 2021 | 5 | 11 | 0 | 16.3000 | 98 | 0.0000 |
| Xinle | Hebei | 53695 | 38.35 | 114.6833 | 70.8000 | 130184 | 2021 | 5 | 11 | 0 | 15.7000 | 71 | 0.0000 |
| Fengning | Hebei | 54308 | 41.2 | 116.6333 | 735.1000 | 130826 | 2021 | 5 | 11 | 0 | 13.3000 | 59 | 0.0000 |
| Lingshou | Hebei | 53680 | 38.3 | 114.3833 | 108.9000 | 130126 | 2021 | 5 | 11 | 0 | 16.1000 | 65 | 0.0000 |
| Nanpi | Hebei | 54719 | 38.012 | 116.6822 | 10.8000 | 130927 | 2021 | 5 | 11 | 0 | 15.8000 | 74 | 0.0000 |
| Xushui | Hebei | 54601 | 38.981 | 115.6433 | 13.1000 | 130609 | 2021 | 5 | 11 | 0 | 14.7000 | 81 | 0.0000 |
| Xinglong | Hebei | 54425 | 40.4 | 117.4667 | 633.2000 | 130822 | 2021 | 5 | 11 | 0 | 14.0000 | 59 | 0.0000 |
| Qing Country | Hebei | 54615 | 38.583 | 116.85 | 8.0000 | 130922 | 2021 | 5 | 11 | 0 | 15.4000 | 75 | 0.0000 |
| Yanshan | Hebei | 54627 | 38.033 | 117.2333 | 8.2000 | 130925 | 2021 | 5 | 11 | 0 | 14.7000 | 83 | 0.0000 |
| Xuzhou | Jiangsu | 58027 | 34.287 | 117.1586 | 41.2000 | 320301 | 2021 | 5 | 11 | 0 | 16.2000 | 76 | 0.0000 |
| Renqiu | Hebei | 54610 | 38.733 | 116.1 | 8.1000 | 130982 | 2021 | 5 | 11 | 0 | 15.3000 | 75 | 0.0000 |
| Dacheng | Hebei | 54613 | 38.7 | 116.6167 | 6.9000 | 131025 | 2021 | 5 | 11 | 0 | 15.3000 | 74 | 0.0000 |
| Xinji | Hebei | 54701 | 37.933 | 115.2 | 35.9000 | 130181 | 2021 | 5 | 11 | 0 | 15.6000 | 75 | 0.0000 |
| Zaoqiang | Hebei | 54708 | 37.5 | 115.7333 | 23.6000 | 131121 | 2021 | 5 | 11 | 0 | 12.3000 | 90 | 0.0000 |
| Zhengzhou | Henan | 57083 | 34.706 | 113.6628 | 110.4000 | 410103 | 2021 | 5 | 11 | 0 | 17.7000 | 67 | 0.0000 |
| Qi Country | Henan | 53974 | 35.609 | 114.2336 | 70.4000 | 410622 | 2021 | 5 | 11 | 0 | 17.8000 | 65 | 0.0000 |
| Laoting | Hebei | 54539 | 39.429 | 118.8867 | 8.5000 | 130225 | 2021 | 5 | 11 | 0 | 16.0000 | 67 | 0.0000 |

FIG. 6

METHOD AND SYSTEM FOR DYNAMICALLY PREDICTING DEOXYNIVALENOL CONTENT OF WHEAT AT HARVEST

TECHNICAL FIELD

The present application relates to the field of agricultural prediction, in particular to a method and system for dynamically predicting a deoxynivalenol content of wheat at harvest.

BACKGROUND

Deoxynivalenol contamination in grains occurs in two stages, i.e., pre-harvest and post-harvest. With the advancement of science and technology and the continuous improvement of national grain storage methods, mycotoxins in grains primarily occur at pre-harvest. Before the harvest, the accumulation of mycotoxins occurs due to the fungal infection in grain crops during the field growth, the impact of farming methods, as well as unstable weather conditions, and varies in different regions and different years. Therefore, it is very important to predict the deoxynivalenol content of grains at pre-harvest, so as to implement targeted preventive measures to fundamentally reduce deoxynivalenol contamination in grains.

In the prior art, most of the methods for predicting the deoxynivalenol content are predicting growth period data of the current year based on growth period data in previous years. However, if there is a large difference between the climatic data of the current year and the climatic data of the same time period in previous years, there may be a large error in the prediction result.

In the prior art, there is also a static prediction method that performs prediction only at a single time point, thus often leading to an inaccurate prediction result.

The prior art further has the problem of an excessively large overhead time of the algorithm employed for multi-dimensional large-batch data.

BRIEF SUMMARY

The objective of the present application is to solve the defects in the prior art by providing a method and system for dynamically predicting a deoxynivalenol content of wheat at harvest.

Embodiments of the present application provide the following technical solutions:

In a first aspect, an embodiment of the application provides a method for predicting a deoxynivalenol content of wheat at harvest. The method includes: obtaining historical data of wheat samples in preset years, the historical data of the wheat samples including: geographic data, historical climatic data, historical growth period data, and historical detection data of a deoxynivalenol content of the wheat samples; for each wheat sample, finding a target Surface Meteorological Observation Station on the basis of the geographic data of the wheat sample, and obtaining a First Flowering Date (FFD) and a First Harvest Date (FHD) of the wheat sample according to historical growth period data of the target Surface Meteorological Observation Station, the geographic data of the wheat sample including: longitude and latitude of the wheat sample; defining a first statistical time periods on the basis of the FFD and the FHD as well as a first preset division rule; applying statistical analysis to historical climatic data according to the first statistical time period, so as to obtain first climatic factors; normalizing the first climatic historical factors to obtain the normalized first climatic factors; extracting key factors from the normalized first climatic factors and the geographic data by a particle swarm optimization algorithm, to obtain the first combined factors; defining different growth stage time periods on the basis of the FFDs and the FHDs as well as a second preset division rule; screening out the second combined factors applicable to growth stage time periods on the basis of the first combined factors; respectively establishing prediction sub-models on the basis of the second combined factors corresponding to growth stage time periods, all the prediction sub-models forming an overall prediction model; obtaining a fitting relationship between growth period data of the wheat samples and the climatic data on the basis of the historical climatic data and the historical growth period data; from climatic data obtained in real time at a prediction point, predicting a second flowering date and a second harvest date of a current year by means of the fitting relationship; selecting a prediction sub-model applicable to the day to be predicted at the prediction point, on the basis of the second flowering date and the second harvest date as well as the date of the day; defining a second statistical time period on the basis of the second flowering date and the second harvest date as well as the first preset division rule; applying statistical analysis to the past climatic data according to the second statistical time period, so as to obtain the second climatic factors; normalizing the second climatic factors to obtain the normalized second climatic factors; inputting the normalized second climatic factors into the prediction sub-model applicable to the day to be predicted at each prediction point, and predicting a current deoxynivalenol content of wheat at the prediction point; and performing a difference operation in a map on the basis of prediction results and geographic data of the prediction points, so as to obtain a risk map of wheat deoxynivalenol contamination in a dynamic prediction region.

Further, the geographic data of the wheat sample includes: the longitude and the latitude of the wheat samples; the historical climatic data includes: hourly air temperature, relative humidity, precipitation, and sunshine hours in previous years; and the growth period data includes: a flowering dates and a harvest dates of wheat in the previous years.

Further, the first preset division rule includes: respectively determining, by means of a first preset time threshold, a first selected time period/a second selected time period by using the FFDs and the FHDs/the second flowering dates and the second harvest dates as a center; and dividing the first selected time period/the second selected time period into the first statistical time period/the second statistical time period by a preset time interval.

Further, the first preset time threshold is 24 days; and the preset time interval has a plurality of first configured values, the first configured values including: 3 days, 5 days, 7 days, 9 days, 11 days, and 13 days.

Further, the second preset time threshold has a plurality of second configured values, the second configured values including: 3 days, 10 days, and 17 days; and the second preset time threshold has a plurality of third configured values, the third configured values including: 4 days and 11 days.

Further, the first climatic factors/the second climatic factors include "average air temperature", "hours with air temperature above 16° C.", "hours with air temperature above 17° C.", "hours with air temperature above 18° C.", "hours with air temperature above 19° C.", "hours with air temperature above 20° C.", "hours with air temperature above 21° C.", "hours with air temperature above 22° C.", "hours with air temperature above 23° C.", "hours with air temperature above 24° C.", "hours with air temperature above 25° C.", "hours with air temperature above 26° C.", "hours with air temperature above 27° C.", "hours with air temperature above 28° C.", "hours with air temperature above 29° C.", "hours with air temperature above 30° C.", "total precipitation", "average relative humidity", "hours with relative humidity above 0%", "hours with relative humidity above 5%", "hours with relative humidity above 10%", "hours with relative humidity above 15%", "hours with relative humidity above 20%", "hours with relative humidity above 25%", "hours with relative humidity above 30%", "hours with relative humidity above 35%", "hours with relative humidity above 40%", "hours with relative humidity above 45%", "hours with relative humidity above 50%", "hours with relative humidity above 55%", "hours with relative humidity above 60%" "hours with relative humidity above 65%", "hours with relative humidity above 70%", "hours with relative humidity above 75%", "hours with relative humidity above 80%","hours with relative humidity above 85%", "hours with relative humidity above 90%", and "average sunshine hours" corresponding to the first statistical time period/the second statistical time period.

Further, the prediction sub-models include:

a first prediction sub-model corresponding to 3 days after the FFD:

$$f_1(x_k^{(1)}) = \text{sgn}(\Sigma_{k=0}^{n1} a_k^{(1)} x_k^{(1)} + b^{(1)})$$

wherein $x_k^{(1)}$ is a second combined factor corresponding to a first growth stage time period, $a_k^{(1)}$ is a first coefficient of a k-th factor, and $b^{(1)}$ is a first constant term, the first growth stage time period being 3 days after the FFD;

a second prediction sub-model corresponding to 10 days after the FFD:

$$f_2(x_k^{(2)}) = \text{sgn}(\Sigma_{k=0}^{n2} a_k^{(2)} x_k^{(2)} + b^{(2)})$$

wherein $x_k^{(2)}$ is a second combined factor corresponding to a second growth stage time period, $a_k^{(2)}$ is a second coefficient of the k-th factor, and $b^{(2)}$ is a second constant term, the second growth stage time period being 10 days after the FFD;

a third prediction sub-model corresponding to 17 days after the FFD:

$$f_3(x_k^{(3)}) = \text{sgn}(\Sigma_{k=0}^{n3} a_k^{(3)} x_k^{(3)} + b^{(3)})$$

wherein $x_k^{(3)}$ is a second combined factor corresponding to a third growth stage time period, $a_k^{(3)}$ is a third coefficient of the k-th factor, and $b^{(3)}$ is a third constant term, the third growth stage time period being 17 days after the FFD;

a fourth prediction sub-model corresponding to 11 days before the FHD:

$$f_4(x_k^{(4)}) = \text{sgn}(\Sigma_{k=0}^{n4} a_k^{(4)} x_k^{(4)} + b^{(4)})$$

wherein $x_k^{(4)}$ is a second combined factor corresponding to a fourth growth stage time period, $a_k^{(4)}$ is a fourth coefficient of the k-th factor, and $b^{(4)}$ is a fourth constant term, the fourth growth stage time period being 11 days before the FHD; and a fifth prediction sub-model corresponding to 4 days before the FHD:

$$f_5(x_k^{(5)}) = \text{sgn}(\Sigma_{k=0}^{n5} a_k^{(5)} x_k^{(5)} + b^{(5)})$$

wherein $x_k^{(5)}$ is a second combined factor corresponding to a fifth growth stage time period, $a_k^{(5)}$ is a fifth coefficient of the k-th factor, and $b^{(5)}$ is a fifth constant term, the fifth growth stage time period being 4 days before the FHD.

In a second aspect, an embodiment of the application provides a system for dynamically predicting a deoxynivalenol content of wheat at harvest. The system includes: a first growth data obtaining module configured to: obtain historical data of a wheat samples in preset years, the historical data of the wheat sample including: geographic data, historical climatic data, historical growth period data, and historical detection data of a deoxynivalenol content of the wheat samples;

a first factor obtaining module configured to: find a target Surface Meteorological Observation Station on the basis of the geographic data of the wheat sample, and obtain FFDs and FHDs of the wheat sample according to historical growth period data of the target Surface Meteorological Observation Station, the geographic data of the wheat sample including: longitude and latitude of the wheat sample; define first statistical time periods on the basis of the FFDs and the FHDs as well as a first preset division rule; apply statistical analysis to historical climatic data of the first statistical time period, so as to obtain first climatic factors;

a prediction model establishment module configured to: normalize the first climatic historical factors to obtain normalized first climatic factors; extract key factors from the normalized first climatic factors and the geographic data by a particle swarm optimization algorithm, so as to obtain first combined factors; define different growth stage time periods on the basis of the FFDs and the FHDs as well as a second preset division rule; screen out the second combined factors applicable to growth stage time periods on the basis of the first combined factors; and respectively establish prediction sub-models on the basis of the second combined factors corresponding to the growth stage time periods, all the prediction sub-models forming an overall prediction model;

a second growth data obtaining module configured to: obtain a fitting relationship between growth period data of the wheat samples and climatic data on the basis of the historical climatic data and the historical growth period data; and according to climatic data obtained in real time at a prediction point, predict a second flowering date and a second harvest date of a current year by means of the fitting relationship;

a prediction model selection module configured to: select a prediction sub-model applicable to the day to be predicted at the prediction point, on the basis of the second flowering date and the second harvest date as well as the date of the day;

a second factor obtaining module configured to: define a second statistical time period on the basis of the second flowering date and the second harvest date as well as the first preset division rule; apply statistical analysis to past climatic data of the second statistical time period, so as to obtain second climatic factors; and normalize the second climatic factors to obtain a normalized second climatic factors; and an early warning display module configured to: input the normalized second climatic factors into the prediction sub-model applicable to the day to be predicted at each prediction point, and predict a current deoxynivalenol content of wheat at the prediction point; and perform a difference operation in a map on the basis of prediction results and geographic data of the prediction points, so as to obtain a risk map of wheat deoxynivalenol contamination in a dynamic prediction region.

The present application provides a method and system for dynamically predicting a deoxynivalenol content of wheat at harvest, including: on the basis of historical data, screening out combined factors applicable to the establishment of a prediction model by a particle swarm optimization algorithm, and establishing the prediction model with the combined factors; on the basis of data of a current year, predicting a second flowering date and a second harvest date of wheat in the current year by means of an agricultural model; then obtaining a weather forecast on the basis of the second flowering date and the second harvest date, and converting the weather forecast and geographic data into relevant factors; and finally predicting the deoxynivalenol content of wheat in the harvest date by means of the prediction model and the relevant factors. Compared with the prior art, statistical items in the prediction model are more perfect and comprehensive, and growth data of the current year can be dynamically predicted on the basis of a growth period index, thus continuously adjusting and establishing the prediction model. In addition, an overhead time for multi-dimensional large-batch data screened out by means of the particle swarm optimization algorithm has more advantages, and the prediction model established by means of a multiple linear regression algorithm has higher precision.

BRIEF DESCRIPTION OF THE DRAWINGS

In order to illustrate the implementations of the present application or the technical solutions in the prior art more clearly, drawings required in the description of the implementations or the prior art are described briefly below. Obviously, the drawings in the following description are only exemplary, and for those of ordinary skill in the art, other implementation drawings can also be derived from the provided drawings without any creative effort.

The structures, proportions, sizes, etc. illustrated in the description are only used to cooperate with the contents disclosed in the description for the understanding and reading by those who are familiar with the prior art, rather than being used to limit the conditions for the implementation of the application, and therefore have no technical substantive meaning. Any modification of the structure, change in the proportional relationship, or adjustment to the size shall still fall within the scope covered by the technical content disclosed in the application, without affecting the effect produced and the objective achieved by the application.

FIG. 5 illustrates a real-time climatic data obtaining interface provided in an embodiment of the application.

FIG. 6 illustrates a weather forecast data obtaining interface provided in an embodiment of the application.

DETAILED DESCRIPTION OF THE DISCLOSURE

The implementations of the present application are described below by means of specific embodiments. Those who are familiar with the prior art can readily understand other advantages and effects of the present application from the content disclosed in the description. Obviously, the described embodiments are only part of the embodiments of the present application rather than all of them. On the basis of the embodiments of the present application, all other embodiments obtained by those of ordinary skill in the art without creative effort shall fall within the scope of protection of the present application.

Definitions of abbreviations and key terms in the embodiments of the application are explained as follows:

Growth period indexes: representing different growth periods of wheat. For the criterion of determining each growth period, refer to the field observation specifications of agrometeorology.

Figure 1:
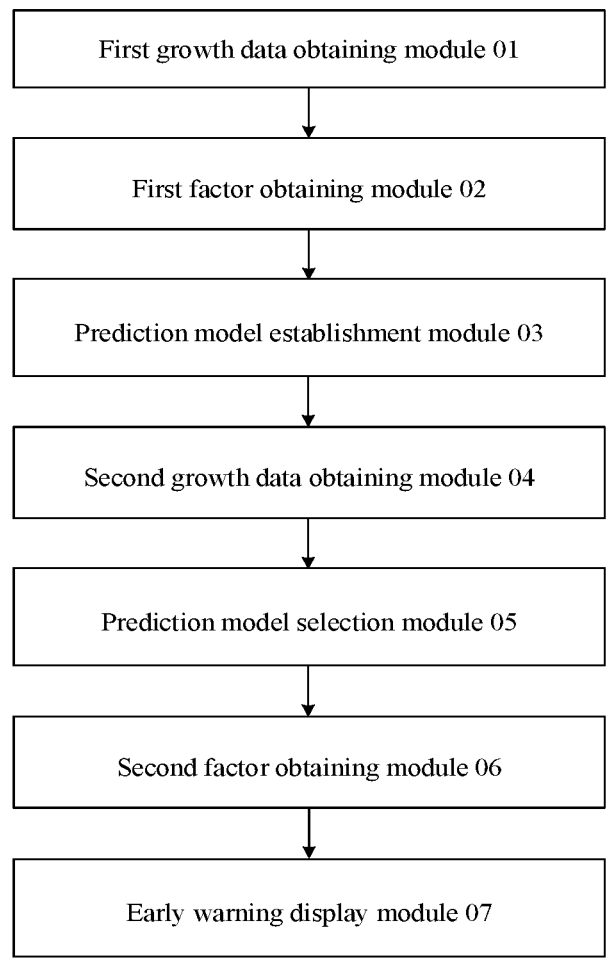
FIG. 1 illustrates a system for dynamically predicting a deoxynivalenol content of wheat on a harvest date provided in an embodiment of the application.

Referring to FIG. 1, an embodiment of the application provides a system for dynamically predicting a deoxynivalenol content of wheat at harvest. The system includes: a first growth data obtaining module 01 configured to: obtain historical data of wheat samples in preset years, the historical data of the wheat samples including: geographic data, historical climatic data, historical growth period data, and historical detection data of a deoxynivalenol content of the wheat samples; a first factor obtaining module 02 configured to: find a target Surface Meteorological Observation Station on the basis of the geographic data of the wheat sample, and obtain FFDs and FHDs of the wheat samples according to historical growth period data of the target Surface Meteorological Observation Station, the geographic data of the wheat sample including: longitude and latitude of the wheat sample; define a first statistical time period by means of a first preset division rule on the basis of the FFDs and the FHDs; apply statistical analysis to historical climatic data of the first statistical time period, so as to obtain first climatic factors; a prediction model establishment module 03 configured to: normalize the first climatic historical factors to obtain the normalized first climatic factors; extract key factors from the normalized first climatic factors and the geographic data by a particle swarm optimization algorithm, so as to obtain the first combined factors; obtain different growth stage time periods by means of a second preset division rule on the basis of the FFD and the FHD; screen out the second combined factors applicable to each growth stage time period on the basis of the first combined factors; and respectively establish prediction sub-models on the basis of the second combined factors corresponding to each growth stage time period, all the prediction sub-models forming an overall prediction model; a second growth data obtaining module 04 configured to: obtain a fitting relationship between growth period data of the wheat sample and climatic data on the basis of the historical climatic data and the historical growth period data; and according to climatic data obtained in real time at a prediction point, predict a second flowering date and a second harvest date of a current year by means of the fitting relationship; a prediction model selection module 05 configured to: select a prediction sub-model applicable to the day to be predicted at the prediction point, on the basis of the second flowering date and the second harvest date as well as the date of the day; a second factor obtaining module 06 configured to: define a second statistical time period on the basis of the second flowering dates and the second harvest dates as well as the first preset division rule; apply statistical analysis to past climatic data of the second statistical time period, so as to obtain second climatic factors; and normalize the second climatic factors to obtain the normalized second climatic factors; and an early warning display module 07 configured to: input the second normalized climatic factors into the prediction sub-model applicable to the day to be predicted at each prediction point, and predict a current deoxynivalenol content of wheat at each prediction point; and perform a difference operation in a map on the basis of a prediction result and geographic data of the prediction point, so as to obtain a risk map of wheat deoxynivalenol contamination in a dynamic prediction region.

A risk early warning model is classified into a quantitative model and a qualitative model. The quantitative model uses the deoxynivalenol content of wheat as a continuous variable to perform prediction. The deoxynivalenol content of wheat is classified into N categories according to a classification rule, thus providing a risk level. Herein, a multiple linear regression model is used to predict a risk level of a deoxynivalenol content of wheat in 2021.

Corresponding to the system for dynamically predicting a deoxynivalenol content of wheat at harvest disclosed above, an embodiment of the application further provides a method for predicting a deoxynivalenol content of wheat at harvest. The method for predicting a deoxynivalenol content of wheat at harvest disclosed in this embodiment of the application is described in detail below with reference to the above-described system for predicting a deoxynivalenol content of wheat at harvest.

Figure 2:
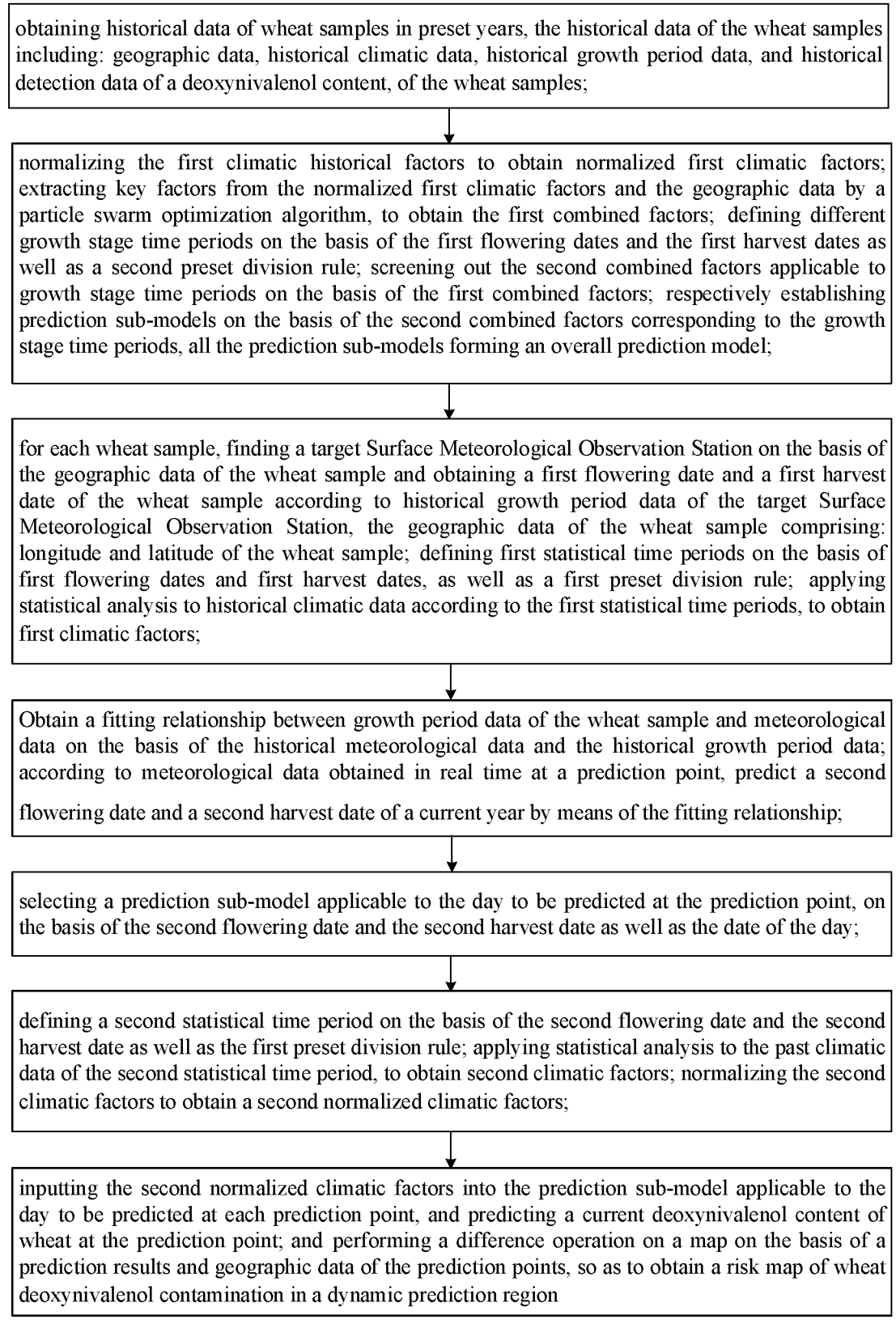
FIG. 2 illustrates a method for dynamically predicting a deoxynivalenol content of wheat on a harvest date provided in an embodiment of the application.

Referring to FIG. 2, an embodiment of the application provides a method for predicting a deoxynivalenol content of wheat at harvest. The method includes: obtaining historical data of wheat samples in preset years, the historical data of the wheat samples including: geographic data, historical climatic data, historical growth period data, and historical detection data of a deoxynivalenol content of the wheat samples; finding a target Surface Meteorological Observation Station on the basis of the geographic data of the wheat sample, and obtaining a FFD and a FHD of the wheat sample according to historical growth period data of the target Surface Meteorological Observation Station, the geographic data of the wheat sample including: longitude and latitude of the wheat sample; obtaining a first statistical time period by means of a first preset division rule on the basis of the FFD and the FHD; applying statistical analysis to historical climatic data of the first statistical time period, so as to obtain first climatic factors; normalizing the first climatic historical factors to obtain the normalized first climatic factors; extracting key factors from the normalized first climatic factors and the geographic data by a particle swarm optimization algorithm, so as to obtain the first combined factors; defining different growth stage time periods by means of a second preset division rule on the basis of the FFDs and the FHDs; screening out the second combined factors applicable to each growth stage time period on the basis of the first combined factors; respectively establishing prediction sub-models on the basis of the second combined factors corresponding to each growth stage time period, all the prediction sub-models forming an overall prediction model; obtaining a fitting relationship between growth period data of the wheat sample and climatic data on the basis of the historical climatic data and the historical growth period data; according to climatic data obtained in real time at a prediction point, predicting a second flowering date and a second harvest date of a current year by means of the fitting relationship; selecting a prediction sub-model applicable to the day to be predicted at the prediction point on the basis of the second flowering date and the second harvest date as well as the date of the day; defining a second statistical time period on the basis of the second flowering date and the second harvest date as well as the first preset division rule; applying statistical analysis to past climatic data of the second statistical time period, so as to obtain second climatic factors; normalizing the second climatic factors to obtain a normalized second climatic factors; inputting the normalized second climatic factors into the prediction sub-model applicable to the day to be predicted at each prediction point, and predicting a current deoxynivalenol content of wheat at each prediction point; and performing a difference operation in a map on the basis of a prediction result and geographic data of the prediction point, so as to obtain a risk map of wheat deoxynivalenol contamination in a dynamic prediction region.

There are many factors that lead to the wheat deoxynivalenol in grains, and main indicators are weather conditions, crop maturity, cultivation conditions, diseases and pests situation, etc. Since the crop maturity, cultivation conditions, as well as diseases and pests situation can only be obtained after sampling is completed, before the harvest, the prediction of a post-harvest deoxynivalenol content of wheat is only performed on the basis of climatic data.

In an embodiment, a risk prediction is performed for a deoxynivalenol content of wheat on a harvest date in 2021, with a start time on April 10 and an end time on June 19, during which a daily prediction is performed at 9:00 am every day, and the prediction includes a quantitative prediction and a classified prediction. Before the risk prediction, a total of 5 prediction models applicable to different growth periods of crops are selected on the basis of an existing model. During the risk prediction, 448 monitoring points are used as prediction reference points, growth period data of wheat in 2016-2020 is fitted into a growth curve, a growth period in 2021 is predicted, and after a prediction model applicable to a current day is determined, a quantitative prediction and a classified prediction for a contamination risk of a post-harvest deoxynivalenol content of wheat at the prediction point are performed by means of real-time data obtained from a climatic big data interface of the National Climatic Center and climatic data required for 15-day forecast data statistics. After the prediction, a risk map of post-harvest wheat deoxynivalenol contamination in the Huang-Huai-Hai region is drawn according to a prediction result.

In an embodiment, a method for finding the Surface Meteorological Observation Station includes the following steps.

Step 1: Read latitude and longitude of a current location, search for all Surface Meteorological Observation Stations within a range of 1 degree longitude in the north-south direction and 1 degree latitude in the east-west direction of the current location, if the number of found Surface Meteorological Observation Stations is not zero, go to step 3, otherwise, go to step 2, and repeat the current step until the number of found Surface Meteorological Observation Stations is not zero.

Step 2: Extend the current range by 1 degree longitude in the north-south direction and 1 degree latitude in the east-west direction.

Step 3: Calculate distances between the current location and all the Surface Meteorological Observation Stations by an enumeration method, and choose a Surface Meteorological Observation Station with a smallest distance as the target Surface Meteorological Observation Station.

Further, the geographic data of the wheat sample includes: the longitude and latitude of the wheat sample; the historical climatic data includes: hourly air temperature, relative humidity, precipitation, and sunshine hours in previous years; and the growth period data includes: the flowering dates and the harvest dates of wheat in the previous years.

Further, the first preset time threshold is 24 days; and the preset time interval has a plurality of first configured values, the first configured values including: 3 days, 5 days, 7 days, 9 days, 11 days, and 13 days.

Specifically, the FFD or the FHD is used as an origin date, and a time period from 24 days before the origin date to 24 days after the origin date is used as a date sampling interval.

Further, the first combined factor is obtained by performing dimensionality reduction processing on the first climatic factors and a geographic factor by the particle swarm optimization algorithm, and a prediction model is established with the first combined factor. On the basis of one or more of the preset time intervals, the first climatic factors are normalized by verifying the correlation between the first climatic factors corresponding to different time intervals and the deoxynivalenol content of wheat on the harvest date. According to different growth stages, the first normalized climatic factors applicable to a preset time point after the flowering date and before the harvest date are screened out. The preset time points include: 3 days, 10 days, and 17 days after the flowering date, and 11 days and 4 days before the harvest date.

Further, the second preset time threshold has a plurality of second configured values, the second configured values including: 3 days, 10 days, and 17 days; and the second preset time threshold has a plurality of third configured values, the third configured values including: 4 days and 11 days.

Further, the first climatic factors/the second climatic factors include "average air temperature", "hours with air temperature above 16° C.", "hours with air temperature above 17° C.", "hours with air temperature above 18° C.", "hours with air temperature above 19° C.", "hours with air temperature above 20° C.", "hours with air temperature above 21° C.", "hours with air temperature above 22° C.", "hours with air temperature above 23° C.", "hours with air temperature above 24° C.", "hours with air temperature above 25° C.", "hours with air temperature above 26° C.", "hours with air temperature above 27° C.", "hours with air temperature above 28° C.", "hours with air temperature above 29° C.", "hours with air temperature above 30° C.", "total precipitation", "average relative humidity", "hours with relative humidity above 0%", "hours with relative humidity above 5%", "hours with relative humidity above 10%", "hours with relative humidity above 15%", "hours with relative humidity above 20%", "hours with relative humidity above 25%", "hours with relative humidity above 30%", "hours with relative humidity above 35%", "hours with relative humidity above 40%", "hours with relative humidity above 45%", "hours with relative humidity above 50%", "hours with relative humidity above 55%", "hours with relative humidity above 60%" "hours with relative humidity above 65%", "hours with relative humidity above 70%", "hours with relative humidity above 75%", "hours with relative humidity above 80%","hours with relative humidity above 85%", "hours with relative humidity above 90%", and "average sunshine hours" corresponding to the first statistical time period/the second statistical time period.

In an embodiment, "average air temperature", "hours with air temperature above 16° C.", "hours with air temperature above 17° C.", "hours with air temperature above 18° C.", "hours with air temperature above 19° C.", "hours with air temperature above 20° C.", "hours with air temperature above 21° C.", "hours with air temperature above 22° C.", "hours with air temperature above 23° C.", "hours with air temperature above 24° C.", "hours with air temperature above 25° C.", "hours with air temperature above 26° C.", "hours with air temperature above 27° C.", "hours with air temperature above 28° C.", "hours with air temperature above 29° C.", "hours with air temperature above 30° C.", "total precipitation", "average relative humidity", "hours with relative humidity above 0%", "hours with relative humidity above 5%", "hours with relative humidity above 10%", "hours with relative humidity above 15%", "hours with relative humidity above 20%", "hours with relative humidity above 25%", "hours with relative humidity above 30%", "hours with relative humidity above 35%", "hours with relative humidity above 40%", "hours with relative humidity above 45%", "hours with relative humidity above 50%", "hours with relative humidity above 55%", "hours with relative humidity above 60%" "hours with relative humidity above 65%", "hours with relative humidity above 70%", "hours with relative humidity above 75%", "hours with relative humidity above 80%","hours with relative humidity above 85%", "hours with relative humidity above 90%", and "average sunshine hours" in each time period are separately calculated with reference to tables 1 to 4.

TABLE 1

Temperature Statistics Interval Design

| Interval Width | >X° C. |
|---|---|
| Interval Configuration (hours) | Average air temperature |
| | Above 16° C. |
| | Above 17° C. |
| | . . . |
| | Above 28° C. |
| | Above 29° C. |
| | Above 30° C. |

TABLE 2

Relative Humidity Statistics Interval Design

| Interval Width | >X% |
|---|---|
| Interval Configuration (hours) | Average |
| | >0% |
| | >5% |
| | . . . |
| | >80% |
| | >85% |
| | >90% |

TABLE 3

Precipitation Statistics Interval Design

| Interval Width | >X mm |
|---|---|
| Interval Configuration (hours) | >0 mm (total precipitation) |

TABLE 4

Sunshine Statistics Interval Design

| Interval Width | >X h |
|---|---|
| Interval Configuration (hours) | Average |

In an embodiment, the first statistical time period is obtained by means of the first preset division rule on the basis of the FFD and the FHD. Specifically, referring to table 5, a time period from 24 days before the FFD to 24 days after the FFD is divided by the first configured value of 3, 5, 7, 9, 11, or 13 days, and a time period from 24 days before the FHD to 24 days after the FHD is divided by the first configured value of 3, 5, 7, 9, 11, or 13 days, so as to analyze weather conditions in a plurality of time periods before and after the flowering date and the harvest date. Details are as follows:

If the first configured value is 3 days, the first selected time periods include: a time period from 24 days before the FFD to 22 days before the FFD, a time period from 23 days before the FFD to 21 days before the FFD, . . . , and a time period from 22 days after the FFD to 24 days after the FFD, which are denoted as (−24, −22), (−23, −21), . . . , and (22, 24); the second selected time periods include: a time period from 24 days before the FHD to 22 days before the FHD, a time period from 23 days before the FHD to 21 days before the FHD, . . . , and a time period from 22 days after the FHD to 24 days after the FHD, which are denoted as (−24, −22), (−23, −21), . . . , and (22, 24).

If the first configured value is 5 days, the first selected time periods include: a time period from 24 days before the FFD to 20 days before the FFD, a time period from 23 days before the FFD to 19 days before the FFD, . . . , and a time period from 20 days after the FFD to 24 days after the FFD, which are denoted as (−24, −20), (−23, −19), . . . , and (20, 24); the second selected time periods include: a time period from 24 days before the FHD to 20 days before the FHD, a time period from 23 days before the FHD to 19 days before the FHD, . . . , and a time period from 20 days after the FHD to 24 days after the FHD, which are denoted as (−24, −20), (−23, −19), . . . , and (20, 24).

If the first configured value is 7 days, the first selected time periods include: a time period from 24 days before the FFD to 18 days before the FFD, a time period from 23 days before the FFD to 17 days before the FFD, . . . , and a time period from 18 days after the FFD to 24 days after the FFD, which are denoted as (−24, −18), (−23, −17), . . . , and (18, 24); the second selected time periods include: a time period from 24 days before the FHD to 18 days before the FHD, a time period from 23 days before the FHD to 17 days before the FHD, . . . , and a time period from 18 days after the FHD to 24 days after the FHD, which are denoted as (−24, −18), (−23, −17), . . . , and (18, 24).

If the first configured value is 9 days, the first selected time periods include: a time period from 24 days before the FFD to 16 days before the FFD, a time period from 23 days before the FFD to 15 days before the FFD, . . . , and a time period from 16 days after the FFD to 24 days after the FFD, which are denoted as (−24, −16), (−23, −15), . . . , and (16, 24); the second selected time periods include: a time period from 24 days before the FHD to 16 days before the FHD, a time period from 23 days before the FHD to 15 days before the FHD, . . . , and a time period from 16 days after the FHD to 24 days after the FHD, which are denoted as (−24, −16), (−23, −15), . . . , and (16, 24).

If the first configured value is 11 days, the first selected time periods include: a time period from 24 days before the FFD to 14 days before the FFD, a time period from 23 days before the FFD to 13 days before the FFD, . . . , and a time period from 14 days after the FFD to 24 days after the FFD, which are denoted as (−24, −14), (−23, −13), . . . , and (14, 24); the second selected time periods include: a time period from 24 days before the FHD to 14 days before the FHD, a time period from 23 days before the FHD to 13 days before the FHD, . . . , and a time period from 14 days after the FHD to 24 days after the FHD, which are denoted as (−24, −14), (−23, −13), . . . , and (14, 24).

If the first configured value is 13 days, the first selected time periods include: a time period from 24 days before the FFD to 12 days before the FFD, a time period from 23 days before the FFD to 11 days before the FFD, . . . , and a time period from 12 days after the FFD to 24 days after the FFD, which are denoted as (−24, −12), (−23, −11), . . . , and (12, 24); the second selected time periods include: a time period from 24 days before the FHD to 12 days before the FHD, a time period from 23 days before the FHD to 11 days before the FHD, . . . , and a time period from 12 days after the FHD to 24 days after the FHD, which are denoted as (−24, −12), (−23, −11), . . . , and (12, 24).

TABLE 5

Climatic Statistical Time Periods

| First Configured Value | 3 days | 5 days | . . . | 11 days | 13 days |
|---|---|---|---|---|---|
| First Statistical Time Period/ Second Statistical Time Period | (−24, −22) (−23, −21) (−22, −20) . . . . . . . . . (21, 23) (22, 24) | (−24, −20) (−23, −19) (−22, −18) . . . . . . . . . (20, 24) | . . . . . . . . . . . . . . . . . . | (−24, −14) (−23, −13) (−22, −12) . . . (14, 24) | (−24, −12) (−23, −11) (−22, −10) . . . (12, 24) |

In an embodiment, in view of the large number (9324 in total) of factors in the first normalized climatic factors, a simple screening method is no longer suitable for screening out key factors, and the particle swarm optimization algorithm is used herein for the screening.

(1) Divide a search space into 9 dimensions, which are respectively geographic data (latitude and longitude), temperature on the flowering dates, temperature on the harvest dates, humidity on the flowering dates, humidity on the harvest dates, precipitation on the flowering dates, precipitation on the harvest dates, sunshine on the flowering dates, and sunshine on the harvest dates.

(2) Use a fitness function as a corrected coefficient of determination of a multiple linear regression model established for particles and deoxynivalenol, wherein the model becomes better when the corrected coefficient of determination becomes larger.

(3) Initialize population particles and randomly generate N particles $X_i^{(0)} = (x_1^{(0)}, x_2^{(0)}, \ldots, x_M^{(0)})$, wherein M is the dimension of the particle; and evaluate each particle to obtain a global optimal particle $X_{gbest}^{(0)}$ and a corresponding global optimal value $F_{gbest}^{(0)}$ (fitness function value).

(4) Update the velocity and location of the N particles by means of velocity and location update formulas, wherein an updated particle location is $X_i^{(l)}$, 1 being the number of iterations; compare fitness values of $X_i^{(l-1)}$ and $X_i^{(l)}$, wherein the one having a larger fitness value is $X_{pbest,\,i}^{(l)}$, and compare fitness values of $X_{pbest,\,1}^{(l)}, X_{pbest,\,2}^{(l)}, \ldots$, and $X_{pbest,\,N}^{(l)}$, wherein the one having the largest fitness value is a global optimal particle $X_{gbest}^{(l)}$ and having a corresponding global optimal value $F_{gbest}^{(l)}$.

(5) Repeat step (4) until an end condition is met, wherein the end condition includes: the number of iterations reaching a preset number or the fitness value being less than a preset fitness value.

Specifically, the particle velocity formula is:

$$v_i = v_i + c_1 \times \text{rand}(\,) \times (pbest_i - z_i) + c_2 \times \text{rand}\,\text{G} \times (gbest_i - z_i),$$

and the location formula is:

$$z_i = z_i + v_i,$$

wherein $i = 1, 2, \ldots, N$ is the total number of particles in the population, and each particle is a set of factors; $c_1$ and $c_2$ are learning factors, $pbest_i$ is the best particle in the current iteration, and $gbest_i$ is the best particle in a previous iteration.

In an embodiment, after the first combined factors are screened out, the prediction model is established on the basis of the first combined factors. In an embodiment, on the basis of the prediction models established according to different flowering conditions, with reference to table 6, an early warning model is established according to deoxynivalenol data, a climatic factor, a geographic factor etc. of the Huang-Huai-Hai region in the previous years. The early warning model is a quantitative prediction model, and the correlations R between predicted values and actual values are 0.71, 0.74, 0.76, 0.77, and 0.78, respectively.

TABLE 6

Different Factor Dimensions of Different Early Warning Models

| Second Combined Factor | Factor Introduction | Prediction Sub-model |||||
|---|---|---|---|---|---|---|
| | | 1 | 2 | 3 | 4 | 5 |
| | | Growth Stage Time Period |||||
| | | 3 days after flowering | 10 days after flowering | 17 days after flowering | 10 days before harvest | 3 days before harvest |
| Latitude | Latitude | √ | √ | √ | √ | √ |
| T1C5 | Average relative humidity in the time period from 24 to 18 days before flowering | | | √ | | |
| T2C1 | Average air temperature in the time period from 17 to 11 days before flowering | √ | √ | | | |
| T2C2 | Hours with air temperature above 25° C. in the time period from 17 to 11 days before flowering | √ | √ | | | |
| T2C3 | Total precipitation in the time period from 17 to 11 days before flowering | √ | √ | √ | √ | |
| T3C1 | Average air temperature in the time period from 10 to 4 days before flowering | | | √ | | |
| T3C2 | Hours with air temperature above 25° C. in the time period from 10 to 4 days before flowering | | | | √ | √ |
| T3C5 | Average relative humidity in the time period from 10 to 4 days before flowering | | | | | √ |
| T4C1 | Average temperature in the time period from 3 days before flowering to 3 days after flowering | √ | √ | √ | √ | √ |
| T4C2 | Hours with air temperature above 25° C. in the time period from 3 days before flowering to 3 days after flowering | √ | √ | √ | √ | √ |
| T4C4 | Hours with relative humidity above 80% in the time period from 3 days before flowering to 3 days after flowering | √ | √ | | | |
| T5C2 | Hours with air temperature above 25° C. in the time period from 4 to 10 days after flowering | | | √ | | |
| T5C3 | Total precipitation in the time period from 4 to 10 days after flowering | | √ | √ | √ | √ |
| T5C4 | Hours with relative humidity above 80% in the time period from 4 to 10 days after flowering | | √ | √ | √ | √ |
| T6C2 | Hours with air temperature above 25° C. in the time period from 11 to 17 days after flowering | | | | √ | √ |
| T6C3 | Total precipitation in the time period from 11 to 17 days after flowering | | | | √ | √ |
| T6C4 | Hours with relative humidity above 80% in the time period from 11 to 17 days after flowering | | | | √ | √ |

TABLE 6-continued

Different Factor Dimensions of Different Early Warning Models

| | | Prediction Sub-model | | | | |
|---|---|---|---|---|---|---|
| | | 1 | 2 | 3 | 4 | 5 |
| | | Growth Stage Time Period | | | | |
| Second Combined Factor | Factor Introduction | 3 days after flowering | 10 days after flowering | 17 days after flowering | 10 days before harvest | 3 days before harvest |
| T7C4 | Hours with relative humidity above 80% in the time period from 24 to 18 days before harvest | | | | √ | |
| T5C7 | Average sunshine in the time period from 4 to 10 days after flowering | | | | | √ |
| T8C3 | Total precipitation in the time period from 17 to 11 days before harvest | | | | √ | √ |
| T8C5 | Average relative humidity in the time period from 17 to 11 days before harvest | | | | | √ |
| T7C7 | Average sunshine in the time period from 24 to 18 days before harvest | | | | | √ |

Further, the prediction sub-models include:

a first prediction sub-model corresponding to 3 days after the FFD:

$$f_1(x_k^{(1)}) = \mathrm{sgn}(\Sigma_{k=0}^{n1} a_k^{(1)} x_k^{(1)} + b^{(1)})$$

wherein $x_k^{(1)}$ is a second combined factor corresponding to a first growth stage time period, $a_k^{(1)}$ is a first coefficient of a k-th factor, and $b^{(1)}$ is a first constant term, the first growth stage time period being 3 days after the FFD;

a second prediction sub-model corresponding to 10 days after the FFD:

$$f_2(x_k^{(2)}) = \mathrm{sgn}(\Sigma_{k=0}^{n2} a_k^{(2)} x_k^{(2)} + b^{(2)})$$

wherein $x_k^{(2)}$ is a second combined factor corresponding to a second growth stage time period, $a_k^{(2)}$ is a second coefficient of the k-th factor, and $b^{(2)}$ is a second constant term, the second growth stage time period being 10 days after the FFD;

a third prediction sub-model corresponding to 17 days after the FFD:

$$f_3(x_k^{(3)}) = \mathrm{sgn}(\Sigma_{k=0}^{n3} a_k^{(3)} x_k^{(3)} + b^{(3)})$$

wherein $x_k^{(3)}$ is a second combined factor corresponding to a third growth stage time period, $a_k^{(3)}$ is a third coefficient of the k-th factor, and $b^{(3)}$ is a third constant term, the third growth stage time period being 17 days after the FFD;

a fourth prediction sub-model corresponding to 11 days before the FHD:

$$f_4(x_k^{(4)}) = \mathrm{sgn}(\Sigma_{k=0}^{n4} a_k^{(4)} x_k^{(4)} + b^{(4)})$$

wherein $x_k^{(4)}$ is a second combined factor corresponding to a fourth growth stage time period, $a_k^{(4)}$ is a fourth coefficient of the k-th factor, and $b^{(4)}$ is a fourth constant term, the fourth growth stage time period being 11 days before the FHD; and a fifth prediction sub-model corresponding to 4 days before the FHD:

$$f_5(x_k^{(5)}) = \mathrm{sgn}(\Sigma_{k=0}^{n5} a_k^{(5)} x_k^{(5)} + b^{(5)})$$

wherein $x_k^{(5)}$ is a second combined factor corresponding to a fifth growth stage time period, $a_k^{(5)}$ is a fifth coefficient of the k-th factor, and $b^{(5)}$ is a fifth constant term, the fifth growth stage time period being 4 days before the FHD.

In an embodiment, the deoxynivalenol content is classified into four risk levels according to prediction results of different sub-models, referring to table 7, which is the basis for a classification standard.

TABLE 7

Prediction Classification Standard

| Risk Level | Value Range of the Deoxynivalenol Content of Wheat (μg/kg) |
|---|---|
| Level 1 | [0, 500) |
| Level 2 | [500, 1500) |
| Level 3 | [1500, 2500) |
| Level 4 | [2500, +∞) |

In an embodiment, referring to table 8, in the process of real-time risk prediction of the deoxynivalenol content of wheat, due to the limitations in obtaining field information and climatic data, variables required by the model are obtained by using a crop growth period as a time reference.

TABLE 8

Use Date Ranges and Required Variables for Each Model

| Prediction Sub-model | Growth Stage Time Period | Second Combined Factors |
|---|---|---|
| First Prediction Sub-model | 3 days after the flowering date | latitude, T2C1, T2C2, T2C3, T4C1, T4C2, T4C4 |
| Second Prediction Sub-model | 10 days after the flowering date | latitude, T2C1, T2C2, T2C3, T4C1, T4C2, T4C4, T5C2, T5C3, T5C4 |
| Third Prediction Sub-model | 17 days after the flowering date | latitude, T1C5, T2C3, T3C1, T4C1, T4C2, T5C3, T5C4, T6C2, T6C3, T6C4 |
| Fourth Prediction Sub-model | 18 days before the harvest date | latitude, T2C3, T3C2, T4C1, T4C2, T5C3, T5C4, T6C2, T6C3, T7C4, T8C3 |
| Fifth Prediction Sub-model | 11 days before the harvest date | latitude, T3C2, T3C5, T4C1, T4C2, T5C3, T5C4, T5C7, T6C4, T7C7, T8C3, T8C5 |

Figure 3:
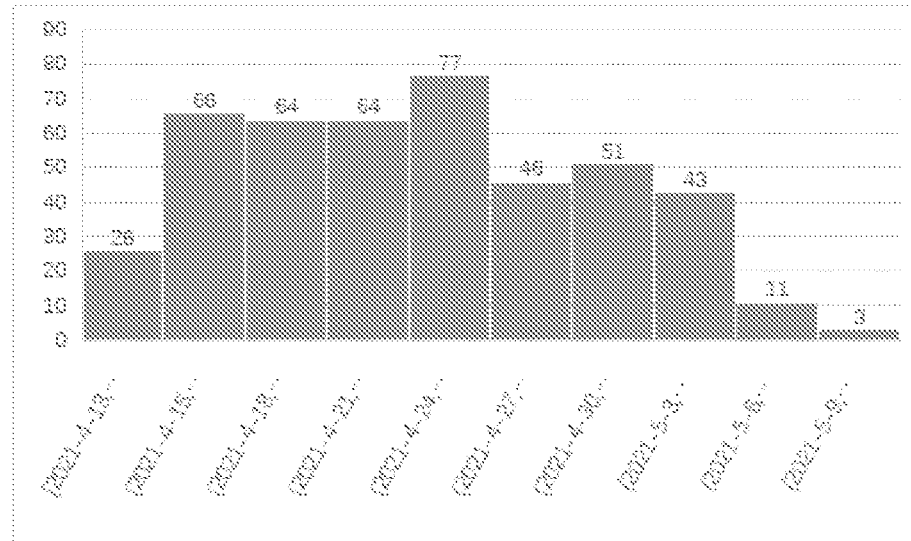
FIG. 3 illustrates a time distribution of flowering dates in the Huang-Huai-Hai region provided in an embodiment of the application.
Figure 4:
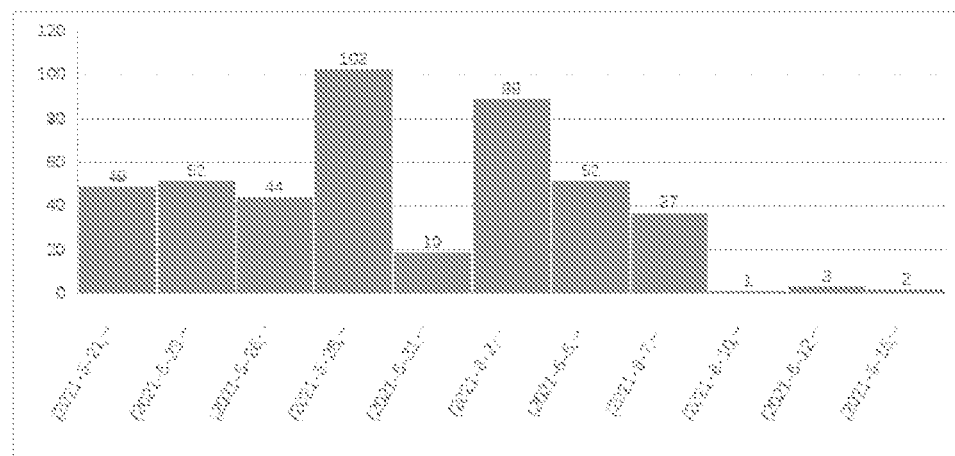
FIG. 4 illustrates a time distribution of harvest dates in the Huang-Huai-Hai region provided in an embodiment of the application.

In an embodiment, referring to FIG. 3 which illustrates a time distribution of flowering dates in the Huang-Huai-Hai region provided in an embodiment of the application, it can be seen that wheat in an area with the earliest flowering date flowers on April 13, and wheat in an area with the latest flowering date flowers on May 11. Referring to FIG. 4 which illustrates a time distribution of harvest dates in the Huang-Huai-Hai region provided in an embodiment of the application, it can be seen that wheat in an area with the earliest harvest date matures on May 21, and wheat in an area with the latest harvest date matures on June 18. Model 1 uses climatic data of a time period 3 days after flowering, and therefore a prediction for the area with the earlier flowering date can start on April 16. The fifth prediction sub-model needs to use data of a time period 11 days before the harvest date, and therefore a pre-harvest prediction can be completed for all the area on June 7.

In an embodiment, the climatic data applied in the risk early warning for wheat in the Huang-Huai-Hai region in 2021 is divided into two portions, one portion being real-time climatic data of a time period from Mar. 1, 2021 to a prediction date, referring to FIG. 5 which illustrates a real-time climatic data obtaining interface provided in an embodiment of the application, and the other portion being forecast data of a time period 15 days after the prediction date, referring to FIG. 6 which illustrates a weather forecast data obtaining interface provided in an embodiment of the application.

Figure 7:
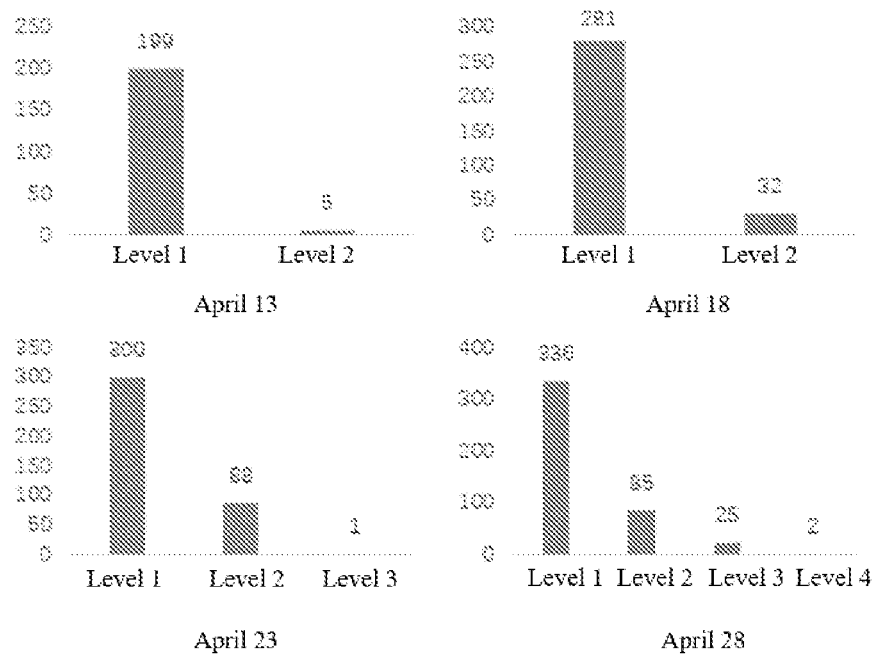
FIG. 7 illustrates statistics of prediction results for risk classification of a deoxynivalenol content of wheat on a harvest date in 2021 provided in an embodiment of the application.

In an embodiment, referring to FIG. 7 which illustrates statistics of prediction results for risk classification of a deoxynivalenol content of wheat on a harvest date in 2021 provided in an embodiment of the application, there are 204 prediction points on April 13, 281 prediction points on April 18, 389 prediction points on April 23, and 448 prediction points on April 28. It can be seen that the number of prediction points increases gradually as the time elapses.

Figure 8:
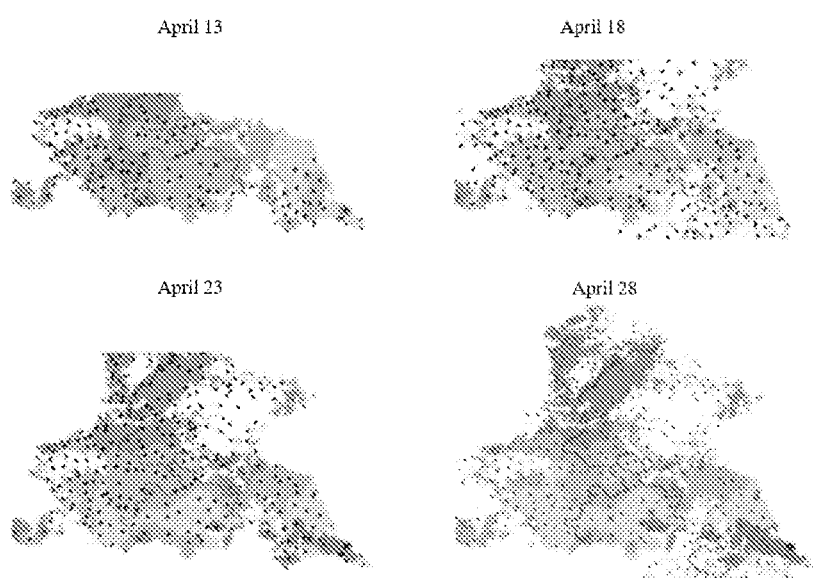
FIG. 8 illustrates a risk map of deoxynivalenol contamination after wheat harvest provided in an embodiment of the application.

In an embodiment, referring to FIG. 8 which illustrates a risk map of deoxynivalenol contamination after wheat harvest provided in an embodiment of the application, the risk map of deoxynivalenol contamination after the wheat harvest is drawn on the basis of the prediction results for the risk level of the deoxynivalenol content of wheat.

The above description of the disclosed embodiments enables a person skilled in the art to achieve or use the application. Various modifications to these embodiments would be obvious to a person skilled in the art. The general principles defined herein may be implemented in other embodiments without departing from the spirit or scope of the application. Therefore, the application is not limited to the embodiments shown herein, but is in accordance with the largest scope consistent with the principles and novel features disclosed herein.

The invention claimed is:

1. A method for dynamically predicting a deoxynivalenol content of wheat at harvest, wherein the method comprises:
obtaining historical data of wheat samples in preset years, the historical data of the wheat samples comprising: geographic data, historical climatic data, historical growth period data, and historical detection data of a deoxynivalenol content, of the wheat samples;
for each wheat sample, finding a target Surface Meteorological Observation Station on the basis of the geographic data of the wheat sample and obtaining a first flowering date and a first harvest date of the wheat sample according to historical growth period data of the target Surface Meteorological Observation Station, the geographic data of the wheat sample comprising: longitude and latitude of the wheat sample;
defining first statistical time periods on the basis of first flowering dates and first harvest dates, as well as a first preset division rule;
applying statistical analysis to historical climatic data according to the first statistical time periods, to obtain first climatic historical factors;
normalizing the first climatic historical factors to obtain normalized first climatic factors; extracting key factors from the normalized first climatic factors and the geographic data by a particle swarm optimization algorithm, to obtain the first combined factors;
defining different growth stage time periods on the basis of the first flowering dates and the first harvest dates as well as a second preset division rule; screening out the second combined factors applicable to growth stage time periods on the basis of the first combined factors;
respectively establishing prediction sub-models on the basis of the second combined factors corresponding to the growth stage time periods, all the prediction sub-models forming an overall prediction model;
obtaining a fitting relationship between growth period data of the wheat samples and the climatic data on the basis of the historical climatic data and the historical growth period data;
from climatic data obtained in real time at a prediction point, predicting a second flowering date and a second harvest date of a current year by means of the fitting relationship;
selecting a prediction sub-model applicable to the day to be predicted at the prediction point, on the basis of the second flowering date and the second harvest date as well as the date of the day;
defining a second statistical time period on the basis of the second flowering date and the second harvest date as well as the first preset division rule; applying statistical analysis to the past climatic data of the second statistical time period, to obtain the second climatic factors; normalizing the second climatic factors to obtain the normalized second climatic factors;
inputting the normalized second climatic factors into the prediction sub-model applicable to the day to be predicted at each prediction point, and predicting a current deoxynivalenol content of wheat at the prediction point; and
performing a difference operation in a map on the basis of prediction results and geographic data of the prediction points, so as to obtain a risk map of wheat deoxynivalenol contamination in a dynamic prediction region.

2. The method for dynamically predicting a deoxynivalenol content of wheat at harvest according to claim 1, wherein the geographic data of the wheat samples comprises: the longitude and the latitude of the wheat samples; the historical climatic data comprises: hourly air temperature, relative humidity, precipitation, and sunshine hours in previous years; and the growth period data comprises: flowering dates and harvest dates of the wheat in the previous years.

3. The method for dynamically predicting a deoxynivalenol content of wheat at harvest according to claim 2, wherein the first preset division rule comprises;
respectively determining, by means of a first preset time threshold, a first selected time period/a second selected time period using the first flowering dates and the first harvest dates/the second flowering dates and the second harvest dates as a center; and
dividing the first selected time period/the second selected time period into the first statistical time period/the second statistical time period by a preset time interval.

4. The method for dynamically predicting a deoxynivalenol content of wheat at harvest according to claim 3, wherein the first preset time threshold is 24 days; and the preset time interval has a plurality of first configured values, the first configured values comprising: 3 days, 5 days, 7 days, 9 days, 11 days, and 13 days.

5. The method for dynamically predicting a deoxynivalenol content of wheat at harvest according to claim 4, wherein the second preset division rule comprises:
   taking a time period after the first flowering date and within a second preset time threshold as a growth stage time period that uses the first flowering date as a time reference; and
   taking a time period before the first harvest date and within a third preset time threshold as a growth stage time period that uses the first harvest date as a time reference.

6. The method for dynamically predicting a deoxynivalenol content of wheat at harvest according to claim 5, wherein the second preset time threshold has a plurality of second configured values, the second configured values comprising: 3 days, 10 days, and 17 days; and the second preset time threshold has a plurality of third configured values, the third configured values comprising: 4 days and 11 days.

7. The method for dynamically predicting a deoxynivalenol content of wheat at harvest according to claim 6, wherein the first climatic factors/the second climatic factors comprise "average air temperature", "hours with air temperature above 16° C.", "hours with air temperature above 17° C.", "hours with air temperature above 18° C.", "hours with air temperature above 19° C.", "hours with air temperature above 20° C.", "hours with air temperature above 21° C.", "hours with air temperature above 22° C.", "hours with air temperature above 23° C.", "hours with air temperature above 24° C.", "hours with air temperature above 25° C.", "hours with air temperature above 26° C.", "hours with air temperature above 27° C.", "hours with air temperature above 28° C.", "hours with air temperature above 29° C.", "hours with air temperature above 30° C.", "total precipitation", "average relative humidity", "hours with relative humidity above 0%", "hours with relative humidity above 5%", "hours with relative humidity above 10%", "hours with relative humidity above 15%", "hours with relative humidity above 20%", "hours with relative humidity above 25%", "hours with relative humidity above 30%", "hours with relative humidity above 35%", "hours with relative humidity above 40%", "hours with relative humidity above 45%", "hours with relative humidity above 50%", "hours with relative humidity above 55%", "hours with relative humidity above 60%", "hours with relative humidity above 65%", "hours with relative humidity above 70%", "hours with relative humidity above 75%", "hours with relative humidity above 80%","hours with relative humidity above 85%", "hours with relative humidity above 90%", and "average sunshine hours" corresponding to the first statistical time period/the second statistical time period.

8. The method for dynamically predicting a deoxynivalenol content of wheat at harvest according to claim 7, wherein the prediction sub-models comprise:
   a first prediction sub-model corresponding to 3 days after the first flowering date:

$$f_1(x_k^{(1)}) = \text{sgn}(\Sigma_{k=0}^{n1} a_k^{(1)} x_k^{(1)} + b^{(1)})$$

wherein $x_k^{(1)}$ is a second combined factor corresponding to a first growth stage time period, $a_k^{(1)}$ is a first coefficient of a k-th factor, and $b^{(1)}$ is a first constant term, the first growth stage time period being 3 days after the flowering date;

a second prediction sub-model corresponding to 10 days after the first flowering date:

$$f_2(x_k^{(2)}) = \text{sgn}(\Sigma_{k=0}^{n2} a_k^{(2)} x_k^{(2)} + b^{(2)})$$

wherein $x_k^{(2)}$ is a second combined factor corresponding to a second growth stage time period, $a_k^{(2)}$ is a second coefficient of the k-th factor, and $b^{(2)}$ is a second constant term, the second growth stage time period being 10 days after the first flowering date;

a third prediction sub-model corresponding to 17 days after the first flowering date:

$$f_3(x_k^{(3)}) = \text{sgn}(\Sigma_{k=0}^{n3} a_k^{(3)} x_k^{(3)} + b^{(3)})$$

wherein $x_k^{(3)}$ is a second combined factor corresponding to a third growth stage time period, $a_k^{(3)}$ is a third coefficient of the k-th factor, and $b^{(3)}$ is a third constant term, the third growth stage time period being 17 days after the first flowering date;

a fourth prediction sub-model corresponding to 11 days before the first harvest data:

$$f_4(x_k^{(4)}) = \text{sgn}(\Sigma_{k=0}^{n4} a_k^{(4)} x_k^{(4)} + b^{(4)})$$

wherein $x_k^{(4)}$ is a second combined factor corresponding to a fourth growth stage time period, $a_k^{(4)}$ is a fourth coefficient of the k-th factor, and $b^{(4)}$ is a fourth constant term, the fourth growth stage time period being 11 days before the first harvest date; and a fifth prediction sub-model corresponding to 4 days before the first harvest date:

$$f_5(x_k^{(5)}) = \text{sgn}(\Sigma_{k=0}^{n5} a_k^{(5)} x_k^{(5)} + b^{(5)})$$

wherein $x_k^{(5)}$ is a second combined factor corresponding to a fifth growth stage time period, $a_k^{(5)}$ is a fifth coefficient of the k-th factor, and $b^{(5)}$ is a fifth constant term, the fifth growth stage time period being 4 days before the first harvest date.

9. A system for dynamically predicting a deoxynivalenol content of wheat at harvest, wherein the system comprises:
   a first growth data obtaining module configured to: obtain historical data of wheat samples in preset years, the historical data of the wheat samples comprising: geographic data, historical climatic data, historical growth period data, and historical detection data of a deoxynivalenol content of the wheat samples;
   a first factor obtaining module configured to: find a target Surface Meteorological Observation Station on the basis of the geographic data of the wheat sample, and obtain first flowering dates and first harvest dates of the wheat sample according to historical growth period data of the target Surface Meteorological Observation Station, the geographic data of the wheat sample comprising: longitude and latitude of the wheat sample; define first statistical time periods on the basis of the first flowering dates and the first harvest dates, as well as a first preset division rule; and apply statistical analysis to historical climatic data according to the first statistical time period, to obtain first climatic historical factors;
   a prediction model establishment module configured to: normalize the first climatic historical factors to obtain first normalized climatic factors; extract key factors from the normalized first climatic factors and the geographic data by a particle swarm optimization algorithm, to obtain first combined factors; define different growth stage time periods on the basis of the first flowering dates and the first harvest dates as well as a second preset division rule; screen out the second combined factors applicable to each growth stage time period on the basis of the first combined factors; and respectively establish prediction sub-models on the basis of the second combined factors corresponding to each growth stage time period, all the prediction sub-models forming an overall prediction model;

a second growth data obtaining module configured to: obtain a fitting relationship between growth period data of the wheat sample and climatic data on the basis of the historical climatic data and the historical growth period data; and according to climatic data obtained in real time at a prediction point, predict a second flowering date and a second harvest date of a current year by means of the fitting relationship;

a prediction model selection module configured to: select a prediction sub-model applicable to the day to be predicted at the prediction point, on the basis of the second flowering date and the second harvest date as well as the date of the day;

a second factor obtaining module configured to: define a second statistical time period on the basis of the second flowering date and the second harvest date as well as the first preset division rule; apply statistical analysis to past climatic data according to the second statistical time period, so as to obtain second climatic factors; and normalize the second climatic factors to obtain a normalized second climatic factors; and an early warning display module configured to: input the normalized second climatic factors into the prediction sub-model applicable to the day to be predicted at each prediction point, and predict a current deoxynivalenol content of wheat at each prediction point; and perform a difference operation in a map on the basis of prediction results and geographic data of the prediction points, so as to obtain a risk map of wheat deoxynivalenol contamination in a dynamic prediction region.

* * * * *